(12) United States Patent
Neumetzler et al.

(10) Patent No.: US 8,118,610 B2
(45) Date of Patent: Feb. 21, 2012

(54) CORE CONNECTOR AND METHOD FOR SPLICING A TWIN CORE INTO AT LEAST ONE EXISTING END-SUBSCRIBER TWIN CORE

(75) Inventors: Heiko Neumetzler, Berlin (DE); Christian Brandt, Kleinmachnow (DE)

(73) Assignee: ADC GmbH, Berlin (DE)

( * ) Notice: Subject to any disclaimer, the term of this patent is extended or adjusted under 35 U.S.C. 154(b) by 8 days.

(21) Appl. No.: 12/713,827

(22) Filed: Feb. 26, 2010

(65) Prior Publication Data
US 2010/0221946 A1 Sep. 2, 2010

(30) Foreign Application Priority Data
Feb. 27, 2009 (DE) .......... 10 2009 010 930

(51) Int. Cl.
*H01R 4/24* (2006.01)
(52) U.S. Cl. ...................................... 439/403
(58) Field of Classification Search .......... 439/403–405, 439/417, 719; 340/2.2
See application file for complete search history.

(56) References Cited

U.S. PATENT DOCUMENTS

| 4,099,822 A | | 7/1978 | Carlisle et al. | |
|---|---|---|---|---|
| 5,338,220 A | * | 8/1994 | Soes et al. | 439/403 |
| 5,498,172 A | * | 3/1996 | Noda | 439/404 |
| 7,156,686 B1 | * | 1/2007 | Sekela et al. | 439/403 |
| 2008/0293268 A1 | * | 11/2008 | Busse et al. | 439/76.1 |

FOREIGN PATENT DOCUMENTS

| DE | 1 918 591 | 11/1969 |
|---|---|---|
| DE | 28 02 638 | 7/1978 |
| GB | 1188789 | 4/1970 |
| WO | WO 97/16036 | 5/1997 |
| WO | WO 2009/046481 | 4/2009 |

* cited by examiner

*Primary Examiner* — Alexander Gilman
(74) *Attorney, Agent, or Firm* — Merchant & Gould P.C.

(57) ABSTRACT

The invention relates to a core connector (1) for splicing at least one twin core (a2, b2), comprising at least one housing (3, 4), in which core connection contacts are arranged, the core connection contacts being in the form of integral twin contacts (K1-K4), a first contact (K11, K21, K31, K41) of the twin contacts (K1-K4) being accessible from the upper side of the housing (3, 4), and a second contact (K12, K22, K32, K42) of the twin contacts (K1-K4) being accessible from the lower side of the housing (3, 4), at least four twin contacts (K1-K4) being provided, which are opposite one another in pairs, as well as to a method for splicing a twin core (a2, b2) into an existing end-subscriber twin core (a, b).

9 Claims, 4 Drawing Sheets

CORE CONNECTOR AND METHOD FOR SPLICING A TWIN CORE INTO AT LEAST ONE EXISTING END-SUBSCRIBER TWIN CORE

This application is claims benefit of Serial No. 10 2009 010 930.7, filed 27 Feb. 2009 in Germany and which application is incorporated herein by reference. To the extent appropriate, a claim of priority is made to the above disclosed applications.

BACKGROUND

The invention relates to a core connector for connecting at least one twin core and a method for splicing a twin core into at least one existing end-subscriber twin core.

Owing to the occurrence of new network providers and the trend for the application of "Fiber to the Home", it is necessary to splice the new copper lines of the new network provider into existing end-subscriber twin cores behind the service point (distribution box) since the replacement of the actual service points is generally not possible for various reasons.

SUMMARY

The invention is based on the technical problem of providing a core connector and a method for splicing a twin core into at least one existing end-subscriber twin core, by means of which the splicing operation can be implemented easily and reliably.

In this regard, the core connector for splicing at least one twin core comprises at least one housing, in which core connection contacts are arranged, the core connection contacts being in the form of integral twin contacts, a first contact of the twin contact being accessible from the upper side of the housing, and a second contact of the twin contact being accessible from the lower side of the housing, at least four twin contacts being provided, which are opposite one another in pairs. In principle, it is not absolutely necessary for the contacts of the twin contacts to be accessible from the upper and lower side, but this does simplify handling of the twin cores. Embodiments are therefore also conceivable in which the first and second contact of a twin contact are accessible from the same side.

In accordance with the method, the splicing of a twin core into at least one existing end-subscriber twin core takes place by means of a jumpering distribution board and at least one core connector, with first of all a first twin core being connected to a first pair of second contacts and a first side of the jumpering distribution board, and a second twin core being connected to a second pair of second contacts and a second side of the jumpering distribution board. Then, the existing end-subscriber twin core is connected to a first pair of first contacts and a second pair of first contacts, which are opposite one another. In this case, in each case one core is connected to a contact of the first and the second pair. Then, the connection at the jumpering distribution board is tested. In the event of a positive test, the end-subscriber twin core is severed between the first pair of first contacts and the second pair of first contacts, with data being fed into the end-subscriber twin core which is connected to the second pair of first contacts, via the second side of the jumpering distribution board.

In a preferred embodiment, the contacts of the twin contacts are in the form of insulation displacement contacts.

In a further preferred embodiment, the core connector is arranged in a housing, the housing having in each case openings for twin cores on a front side and a rear side. In this case, the housing can also be configured in such a way that a plurality of core connectors can be accommodated.

In a further preferred embodiment, the housing, in which the twin contacts are arranged, is formed on the upper side with a wall, which is arranged between the twin contacts, which are opposite one another in pairs, and has apertures for cores. The wall prevents incorrect attachment of a clip-on tool.

BRIEF DESCRIPTION OF THE DRAWINGS

The invention will be explained in more detail below with reference to a preferred exemplary embodiment. In the figures.

DETAILED DESCRIPTION

Figure 1:
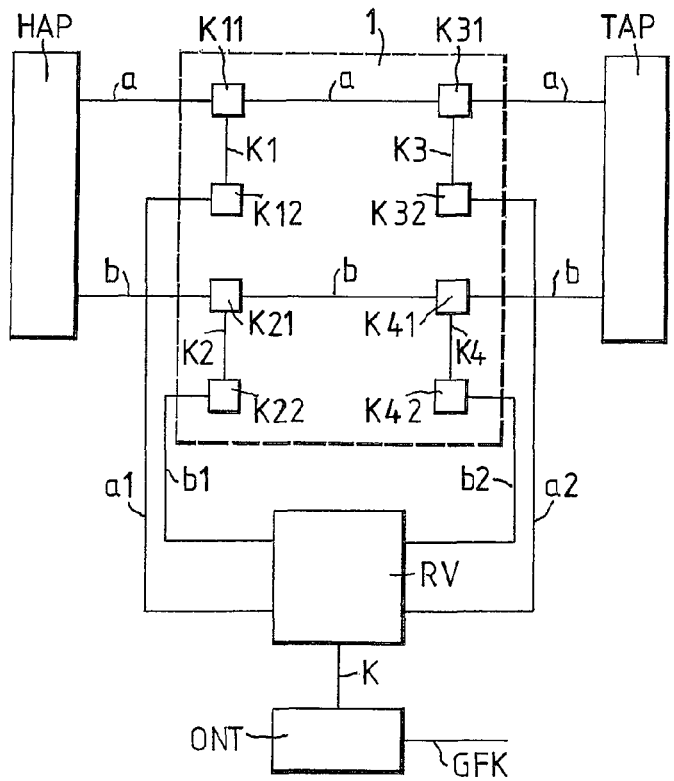
FIG. 1 shows a schematic circuit arrangement for splicing a twin core into an existing end-subscriber twin core.

FIG. 1 is a schematic illustration of a circuit arrangement for splicing a twin core a2, b2 into an existing end-subscriber twin core a, b. The end-subscriber twin core a, b is originally arranged between a service point HAP and a subscriber terminal point TAP (for example a TAE socket). The circuit arrangement comprises a jumpering distribution board RV and an ONT (optical network terminal). The ONT is connected to fiberoptic cables GFK. Furthermore, the ONT is connected to the jumpering distribution board RV via electrical cores or cables K. In the ONT, the optical signals which are transmitted via the fiberoptic cable GFK are converted into electrical signals and passed on via electrical cables. The actual splicing operation takes place by means of a core connector 1, which is illustrated schematically in FIG. 1. The core connector 1 comprises four twin contacts K1-K4. In this case, the twin contacts K1, K2 form a first pair, and the twin contacts K3, K4 form a second pair. In this case, the twin contacts K1 and K3, and K2 and K4 are opposite one another. Each twin contact K1-K4 has first contacts $K_{X1}$ (where x=1 . . . 4) and second contacts $K_{X2}$, the first contacts $K_{X1}$ serving the purpose of making contact with the end-subscriber twin core a, b. In a first step, a first twin core a1, b1 is connected to the second contacts K12, K22 of the twin contacts K1 and K2 of the core connector 1, and a first side of the jumpering distribution board RV. Furthermore, the second twin core a2, b2 to be spliced is connected to a second side of the jumpering distribution board RV and to the second contacts K32, K42 of the twin contacts K3 and K4. Then, all of the first contacts K11-K41 of the four twin contacts K1 to K4 are connected to the end-subscriber twin core a, b. In the jumpering distribution board RV, the two twin cores a1, b1; a2, b2 are then jumpered through, with the result that the correct connection to the twin core a, b can be checked. If the subscriber now desires data from the ONT, the end-subscriber twin core a, b is severed between the first contacts K11 and K31 or the first contacts K21 and K41, for example by means of a clip-on tool, and jumpered through at the jumpering distribution board RV. The jumpering in this case takes place in such a way that the subscriber only receives data from the ONT. In the preliminary stages, two configurations are possible as long as the end subscriber does not desire any new services. Firstly, the data interchange can take place from the service point HAP further via the twin core a, b, in which case the jumpering-through in the jumpering distribution board RV is preferably interrupted again. Secondly, the data interchange from the service point HAP can also take place via the jumpering-through in the jumpering distribution board RV. However, in this case the twin core a, b can already be severed between the first contacts K11 and K31 or K21 and K41 prior to switching over to the ONT, with the result that it is necessary to jumper-through when switching over exclusively at the jumpering distribution board RV.

Figure 2:
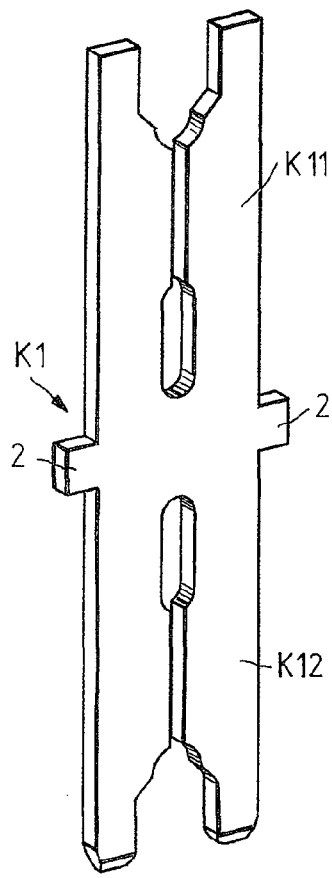
FIG. 2 shows a perspective illustration of a twin contact.

FIG. 2 illustrates a twin contact K1, with the statements relating to K1 also applying correspondingly to the other twin contacts K2-K4. The twin contact K1 is in the form of a twin insulation displacement contact, the two first and second contacts K11 and K12 being arranged in mirror-symmetrical fashion. In the center, the twin contact K1 has two projections 2 opposite one another on both sides on the longitudinal sides, by means of which projections the twin contact K1 is supported in a housing upper part 3 (see FIG. 3) or a housing lower part 4 (see FIG. 4).

Figure 3:
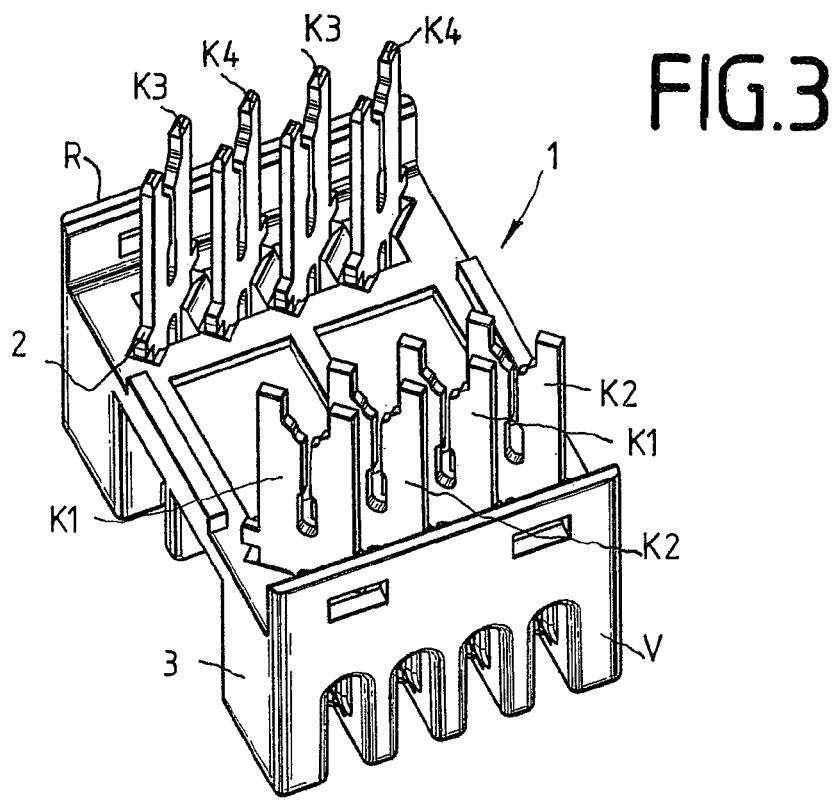
FIG. 3 shows a perspective illustration of a core connector for two twin cores with the housing lower part removed.

FIG. 3 illustrates a core connector 1 for two end-subscriber twin cores a, b, with four pairs of twin contacts K1-K4 being inserted into a housing upper part 3. Two first pairs of twin contacts K1, K2 are arranged on the front side V of the core connector 1. Two second pairs of twin contacts K3, K4 are arranged on the rear side, with in each case only the second contacts $K_{x2}$ of the twin contacts K1-K4 of the four pairs being shown. In this case, the first twin contacts K1, K2 are set at an angle of 90° with respect to the second twin contacts K3, K4. However, embodiments are also possible in which the contacts K1 and K3, and K2 and K4 which are opposite one another are parallel to one another. In this case, it can also be provided that then adjacent pairs of twin contacts K1, K2 and K3, K4 are arranged offset through 90° with respect to one another.

Figure 4:
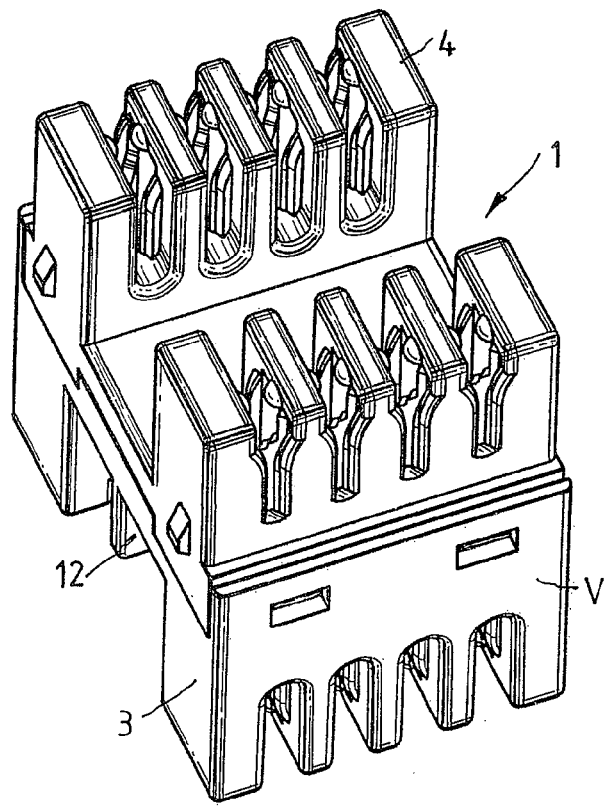
FIG. 4 shows a perspective illustration of a completely assembled core connector.

FIG. 4 illustrates the assembled core connector 1 with the housing upper part 3 and the housing lower part 4.

Figure 5:
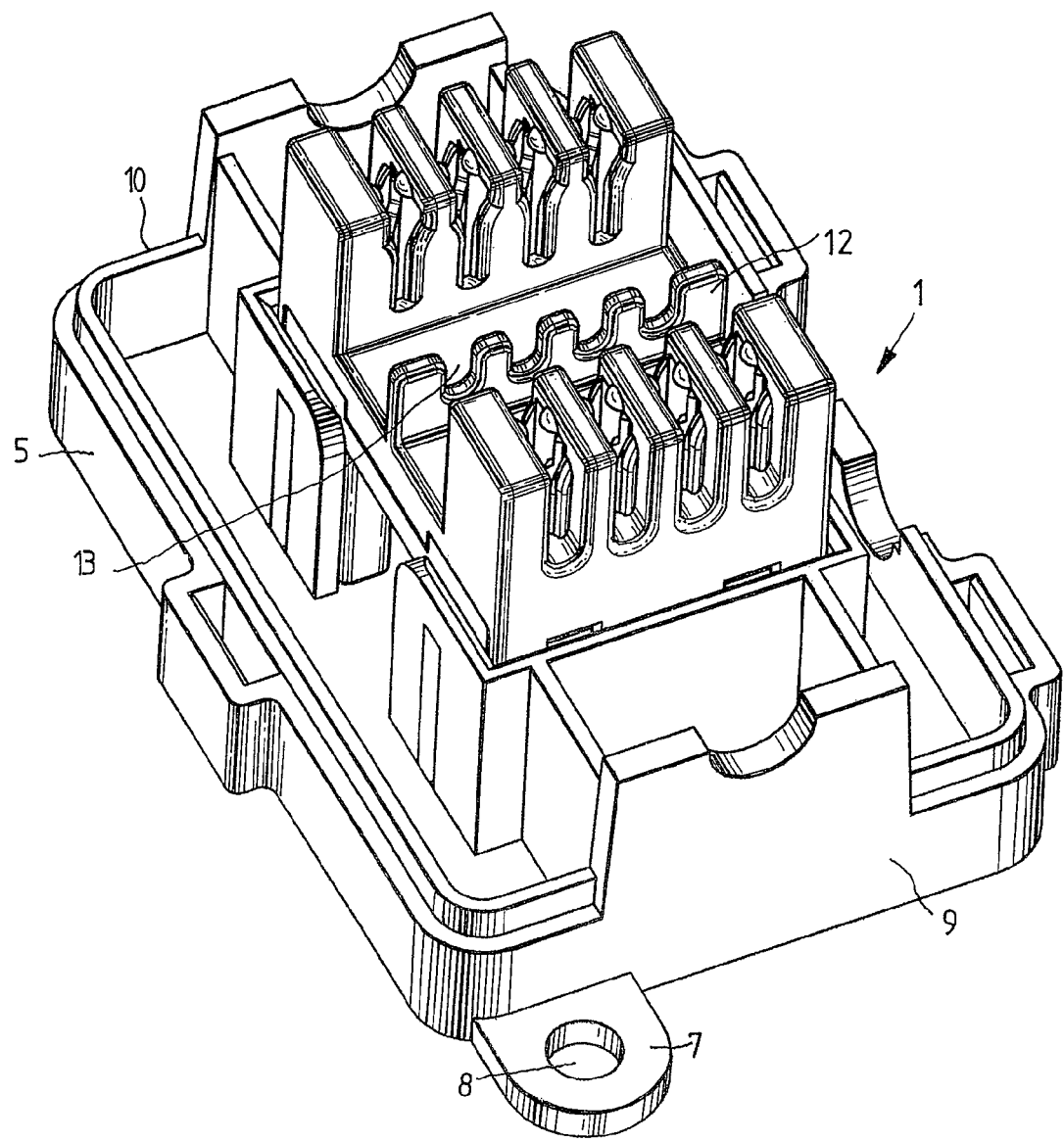
FIG. 5 shows a perspective illustration of a core connector in an outer housing lower part.
Figure 6:
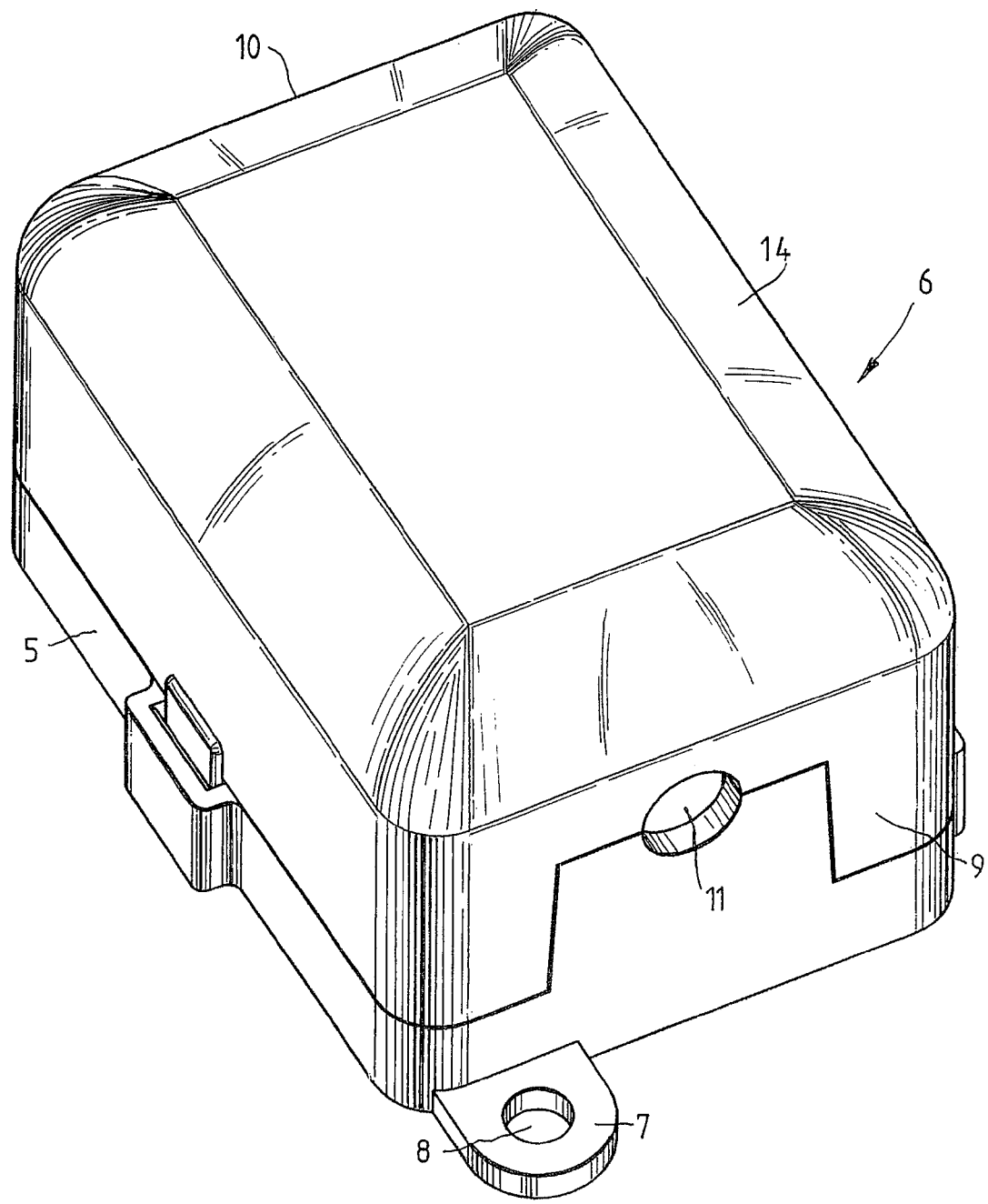
FIG. 6 shows a perspective illustration of an outer housing for accommodating a core connector.

In FIG. 5, the core connector 1 has been inserted into a further housing lower part 5 of an outer housing 6, which is illustrated completely with the housing upper part 14 in FIG. 6. The housing lower part 5 is formed with at least one lug 7 with a bore 8 in order to fasten the housing 6 on a wall. Furthermore, the housing 6 has openings 11 in each case on a front side 9 and a rear side 10, through which openings twin cores can be guided. In this case, the housing lower part 5 and the housing upper part 14 each have a semicircular notch, with the result that a circular opening 11 is formed in the assembled state (see FIG. 6). The housing upper part 3 of the core connector 1 has a wall 12, which is arranged between the opposite twin contacts K1, K2; K3, K4. In this case, the wall 12 has apertures 13, through which the twin cores a, b can be guided. In this case, the wall 12 has the function of preventing the actuation of an incorrectly applied clip-on tool, with the result that the twin core a, b is not accidentally severed between the twin contacts K3, K4 and the TAP (see FIG. 1) or HAP and K1, K2. Finally, mention is made of the fact that the core connector can also be formed by separate contact rows, with the result that the twin contacts K1, K2 and K3, K4 are each arranged in a dedicated housing. It is further noted that the core connector can also be filled with gel or is filled with gel in order to protect the contacts against moisture.

One aspect of the invention relates to a core connector for splicing at least one twin core, comprising at least one housing, in which core connection contacts are arranged, wherein the core connection contacts are formed as integral twin contacts (K1-K4), a first contact (K11, K21, K31, K41) of the twin contacts (K1-K4) being accessible from the upper side of the housing, and a second contact (K12, K22, K32, K42) of the twin contacts (K1-K4) being accessible from the lower side of the housing, at least four twin contacts (K1-K4) being provided, which are opposite one another in pairs.

Another aspect of the invention relates to a method for splicing a twin core (a2, b2) into at least one existing end-subscriber twin core (a, b), by means of a jumpering distribution board (RV) at least one core connector (1), comprising the following method steps:

a) connection of a first twin core (a1, b1) to a first pair of second contacts (K12, K22) and a first side of the jumper distribution board (RV), b) connection of a second twin core (a2, b2) to a second pair of second contacts (K32, K42) and a second side of the jumper distribution board (RV), c) connection of the existing end-subscriber twin core (a, b) to a first pair of first contacts (K11, K21) and a second pair of first contacts (K31, K41), which are opposite one another, d) testing of the connection at the jumpering distribution board (RV), and e) severing of the end-subscriber twin core (a, b) between the first pair of first contacts (K11, K21) and the second pair of first contacts (K31, K41), it being possible for data to be fed into the end-subscriber twin core (a, b) which is connected to the second pair of first contacts (K31, K41), via the second side of the jumpering distribution board (RV).

LIST OF REFERENCE SYMBOLS

1 Core connector
2 Projections
3 Housing upper part
4 Housing lower part
5 Further housing lower part
6 Outer housing
7 Lug
8 Bore
9 Front side
10 Rear side
11 Openings
12 Wall
13 Apertures
14 Housing upper part
K1 Twin contact
K2 Twin contact
K3 Twin contact
K4 Twin contact
K11 Contact
K12 Contact
K21 Contact
K22 Contact
K31 Contact
K32 Contact
K41 Contact
K42 Contact
a, b End-subscriber twin core
a1, b1 First twin core
a2, b2 Second twin core
R Rear side
V Front side
RV Jumpering distribution board ONT optical network terminal
K Cable
GFK Fiberoptic cable
HAP Service point
TAP Subscriber terminal point

The invention claimed is:

1. A core connector for splicing at least one twin core, comprising:
   at least one housing having an upper side opposite from a lower side and a first side opposite from a second side, the housing including a wall extending along the upper side of the housing between the first and second sides, the wall defining a plurality of apertures;
   core connection contacts disposed in the housing, wherein the core connection contacts are formed as integral twin contacts, a first contact of each of the twin contacts being accessible from the upper side of the housing, and a second contact of each of the twin contacts being accessible from the lower side of the housing, wherein the twin contacts of a first pair of the twin contacts are disposed on opposite ends of the housing and wherein the twin contacts of a second pair of the twin contacts also are disposed at the opposite ends of the housing so that the wall extends between the twin contacts of each pair.

2. The core connector as claimed in claim 1, wherein the contacts of the twin contacts are in the form of insulation displacement contacts.

3. The core connector as claimed in claim 1, wherein the core connector is arranged in a further housing, the further housing having openings for twin cores on a front side and a rear side of the further housing.

4. The core connector as claimed in claim 1, wherein the wall defines at least four apertures for cores.

5. The core connector as claimed in claim 1, wherein the core connection contacts form at least four pairs of integral twin contacts.

6. The core connector as claimed in claim 5, wherein two of the pairs of integral twin contacts are disposed in a first row at the first end of the housing and two of the pairs of integral twin contacts are disposed in a second row at the second end of the housing.

7. The core connector as claimed in claim 6, wherein the integral twin contacts are oriented in a common direction.

8. The core connector as claimed in claim 1, wherein the housing includes an upper part coupled to a lower part, the upper part defining a plurality of slots at which the first contacts of the integral twin contacts are accessed, and the lower part defining a plurality of slots at which the second contacts of the integral twin contacts are accessed.

9. The core connector as claimed in claim 1, wherein the integral twin contacts of the first pair are set at a 90° angle relative to the integral twin contacts of the second pair.

* * * * *